H. C. BERRY.
SPEEDOMETER.
APPLICATION FILED DEC. 15, 1908.
941,223.
Patented Nov. 23, 1909.
2 SHEETS—SHEET 1.
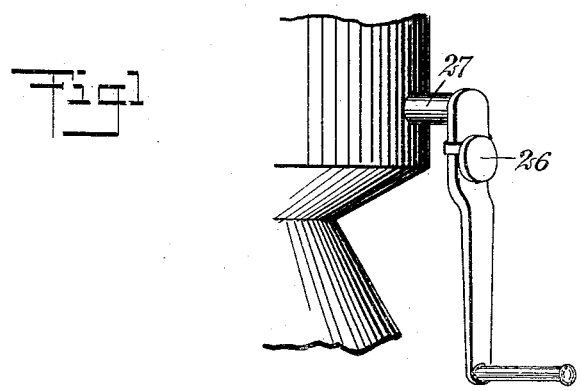
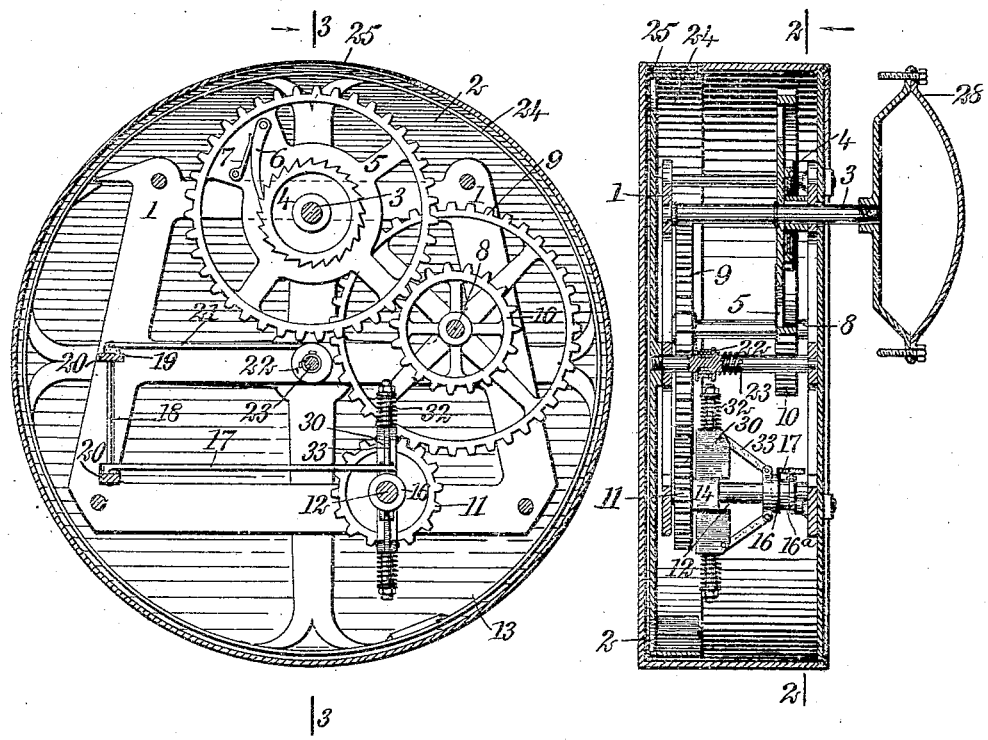
WITNESSES
INVENTOR
Harry C. Berry
BY
ATTORNEYS

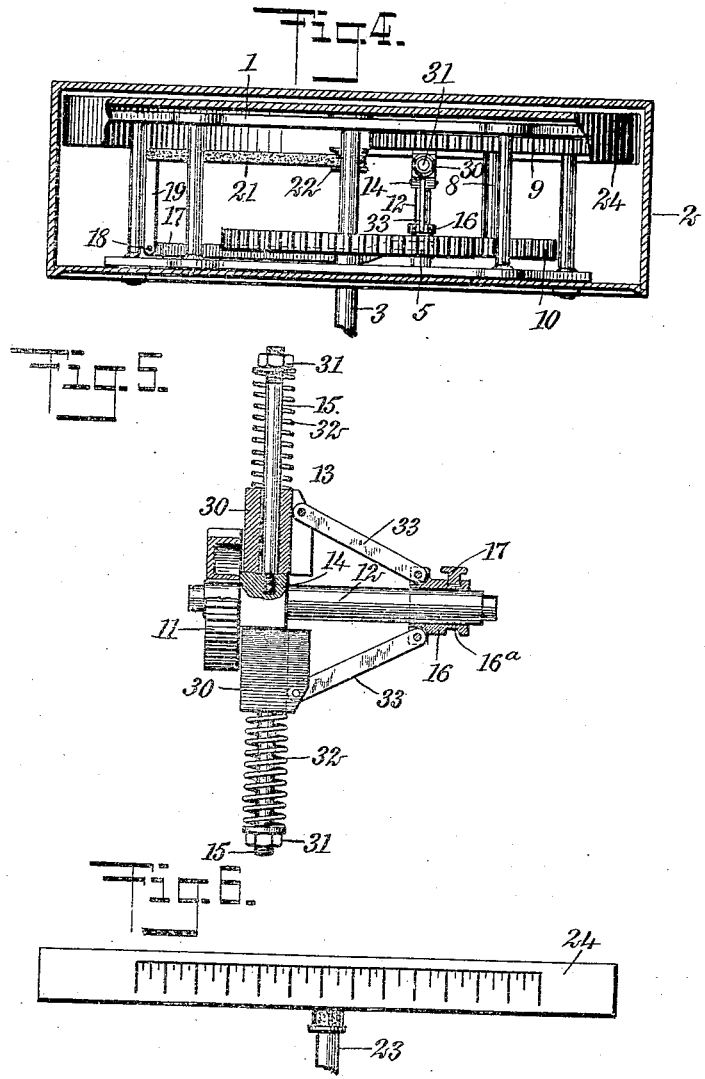

UNITED STATES PATENT OFFICE.

HARRY C. BERRY, OF TOLEDO, OHIO.

SPEEDOMETER.

941,223.

Specification of Letters Patent. Patented Nov. 23, 1909.

Application filed December 15, 1908. Serial No. 467,682.

*To all whom it may concern:*

Be it known that I, HARRY C. BERRY, a citizen of the United States, and a resident of Toledo, in the county of Lucas and State of Ohio, have invented a new and Improved Speedometer, of which the following is a full, clear, and exact description.

My invention relates to speedometers, and has for its object to provide one in which a shaft is journaled at one side of its center of gravity, the shaft being adapted to be secured to a rotating piece of machinery, and by means of a pawl and ratchet wheel and a chain of gearing it is adapted to rotate a shaft on which a governor is mounted to revolve therewith, the governor having a collar slidably mounted on the shaft which operates levers which draw tape wound on a drum secured to the indicator wheel shaft.
Still other objects of the invention will appear in the following complete description.

In this specification I will describe the preferred form of my invention, but it will be understood that I do not limit myself thereto, as I consider myself entitled to all forms and embodiments of the invention which may be held to fall within the scope of the appended claims.
Reference is to be had to the accompanying drawings forming a part of this specification, in which similar characters of reference indicate corresponding parts in all the figures, in which—
Figure 1 shows my invention secured to a crank on a piece of machinery; Fig. 2 is a sectional view on the line 2—2 of Fig. 3; Fig. 3 is a sectional view on the line 3—3 of Fig. 2; Fig. 4 is a horizontal sectional view, the casing and part of the indicator wheel being broken away to show the operating mechanism; Fig. 5 is an enlarged view showing the governor and the shaft on which it is mounted, parts being broken away and in section; and Fig. 6 is an enlarged plan view of the indicator wheel.

By referring to the drawings, it will be seen that a frame 1 is mounted in a casing 2, a shaft 3 being journaled in the frame, this shaft 3 extending through one side of the casing 2. To this shaft 3 is secured a ratchet wheel 4, and there is also mounted on this shaft 3 a gear wheel 5, said gear wheel being free to rotate relatively to the shaft 3.
On one side of the gear wheel 5 is pivoted a pawl 6, a spring 7 being adapted to hold the pawl 6 in engagement with the teeth of the ratchet wheel 4. A shaft 8 is also journaled in the frame 1, there being secured to this shaft 8, gear wheels 9 and 10, the gear wheel 10 meshing with the gear wheel 5 and the gear wheel 9 meshing with a gear wheel 11, secured to a shaft 12, this shaft 12 also being journaled in the frame 1. Mounted on this shaft 12 there is a governor 13. The governor is constructed as follows: To the shaft 12 is secured a block 14, in orifices in which are screwed oppositely radially disposed rods 15, there being weights 30 with orifices therein, one of which weights is disposed on each of the rods 15. Nuts 31 are screwed on the threaded free terminals of the rods 15, and between the weights 30 and the nuts 31 are disposed springs 32. Mounted on the shaft 12 is a collar 16 with a groove 16ª, the collar 16 being connected with the weights 30 by means of links 33. A lever 17 has one end disposed in the groove 16ª, this lever 17 being secured to a vertical shaft 18, there being a second lever 19, secured near the upper terminal of the said shaft 18, the shaft 18 being journaled in frame members 20 secured to the principal frame 1. To the lever 19 is secured a tape 21, the said tape being mounted on a drum 22, the drum being secured to a shaft 23, to which is also secured an indicator wheel 24. In the casing 2 there is a portion 25, in which glass is inserted to permit the reading of the indicator wheel without opening the casing. If desired, a spring 35 may be secured to the shaft 23 to keep the tape 21 wound on the drum 22 when the speedometer is not in use.

In using my invention, the shaft 3 is secured radially to a rotating piece of machinery, for instance as shown in Fig. 1, where an indicator wheel 26 is secured to a crank, adapted to rotate a shaft 27 and the shaft 3 may be secured to the machinery by means of a clamp 28 which is mounted on the outer terminal of the shaft 3. When the speedometer has been secured to the machinery and the machinery is in motion, the shaft 3 being near the periphery of the casing, gravity will prevent the rotation of the speedometer with the machinery, which will cause the shaft 3 to rotate relatively to the casing 2 and to the frame 1, which will set the gearing in operation, by which means the shaft 12 will be rotated, and as the shaft 12 rotates the weights 30 will, by centrifugal force be forced outwardly against the pressure of the springs 32, and by means of the links 33 will draw in the collar 16, operating the lever 17, thereby rotating the shaft 18 and operating the lever 19 which draws on the tape 21 and operates the indicator wheel 24.

Having thus described my invention, I claim as new and desire to secure by Letters Patent:

1. In a speedometer an annular casing, a frame secured thereto, a central shaft journaled in the frame, an indicator wheel secured to the central shaft, the indicator wheel being disposed in close proximity to the inner side of the annular casing, a second shaft journaled in the frame, a governor mounted for rotating on the second shaft, a collar slidably mounted on the second shaft, the movement of which is controlled by the governor, a third shaft, a lever secured thereto, which is adapted to be operated by the collar, a second lever secured to the third shaft, a drum on the first shaft, a tape wound on the drum and connected to the second lever, and means to rotate the second shaft.

2. In a speedometer an annular casing, a frame secured thereto, a central shaft journaled in the frame, an indicator wheel secured to the central shaft and disposed around the frame in close proximity to the inner side of the annular casing, there being an opening in the periphery of the annular casing to exhibit a surface of the indicator wheel, a second shaft journaled in the frame, a governor mounted for rotating on the second shaft, a collar slidably mounted on the second shaft, the movement of which is controlled by the governor, a third shaft, a lever secured thereto, which is adapted to be operated by the collar, a second lever secured at the third shaft, a drum on the central shaft, a tape wound on the drum and connected to the second lever, and means to rotate the second shaft.

3. In a speedometer an annular casing, a frame secured thereto, a central shaft journaled in the frame, an indicator wheel secured to the central shaft and disposed around the frame in close proximity to the inner side of the annular casing, there being an opening in the periphery of the annular casing to exhibit a surface of the indicator wheel a second shaft journaled in the frame, a governor mounted for rotating on the second shaft, a collar slidably mounted on the second shaft, the movement of which is controlled by the governor, a third shaft, a lever secured thereto, which is adapted to be operated by the collar, a second lever secured at the third shaft, a drum on the central shaft, a tape wound on the drum and connected to the second lever, means to rotate the second shaft, a fourth shaft adapted to operate the last named means, the fourth shaft being journaled in the frame at one side of the center of gravity of the speedometer, and means for connecting the fourth shaft with a revolving piece of machinery.

In testimony whereof I have signed my name to this specification in the presence of two subscribing witnesses.

HARRY C. BERRY.

Witnesses:
S. B. EPLER,
G. A. TAFT.